US010207195B2

(12) United States Patent
Xu

(10) Patent No.: US 10,207,195 B2
(45) Date of Patent: Feb. 19, 2019

(54) STAGE SMOKE MACHINE WITH FAST SPRAY GAS COLUMN AND ELECTROMAGNETIC VALVE MODULE THEREOF

(71) Applicant: Guangzhou DJPOWER Electronic Technology Co., Ltd., Guangzhou, Guangdong (CN)

(72) Inventor: Hui Xu, Guangdong (CN)

(73) Assignee: Guangzhou DJPOWER Electronic Technology Co., Ltd., Guangzhou, Guangdong (CN)

(*) Notice: Subject to any disclaimer, the term of this patent is extended or adjusted under 35 U.S.C. 154(b) by 147 days.

(21) Appl. No.: 15/501,410

(22) PCT Filed: Dec. 4, 2015

(86) PCT No.: PCT/CN2015/096373
§ 371 (c)(1),
(2) Date: Feb. 2, 2017

(87) PCT Pub. No.: WO2017/084117
PCT Pub. Date: May 26, 2017

(65) Prior Publication Data

US 2017/0259184 A1 Sep. 14, 2017

(30) Foreign Application Priority Data

Nov. 19, 2015 (CN) ..................... 2015 2 0934500 U

(51) Int. Cl.
*F24F 6/08* (2006.01)
*A01G 13/06* (2006.01)
(Continued)

(52) U.S. Cl.
CPC ................. *A63J 5/025* (2013.01); *A63J 5/02* (2013.01); *B05B 7/168* (2013.01); *B05B 7/1686* (2013.01)

(58) Field of Classification Search
CPC .... A63J 5/02; A63J 5/025; B05B 1/00; B05B 1/24; B05B 7/00; B05B 7/168;
(Continued)

(56) References Cited

U.S. PATENT DOCUMENTS

| | | | | |
|---|---|---|---|---|
| 5,668,014 A * | 9/1997 | Aoki | G01N 31/005 436/110 |
| 7,422,198 B2 * | 9/2008 | Yoshioka | B01D 1/0082 118/719 |

(Continued)

FOREIGN PATENT DOCUMENTS

| | | |
|---|---|---|
| CN | 203564792 U | 4/2014 |
| CN | 203954698 U | 11/2014 |

(Continued)

*Primary Examiner* — Sang Y Paik
(74) *Attorney, Agent, or Firm* — Novick, Kim & Lee, PLLC; Allen Xue

(57) ABSTRACT

A stage smoke machine with a fast spray gas column includes an oil barrel, an oil pump, a gas tank, a first electromagnetic valve, a heater, a gas-filling device and a controller. In case of gas loss in the gas tank, the gas tank is replenished with the gas by the gas-filling device so that the gas pressure in the gas tank can be maintained at a pressure sufficient to fast spray smoke oil into the heater, thereby ensuring that every time the smoke machine is started, the smoke machine can quickly show a high level stage effect of fast sprayed smoke. Further, an electromagnetic valve module is formed by installing at least two electromagnetic valves integrally on a base.

16 Claims, 10 Drawing Sheets

(51) Int. Cl.
*A63J 5/02* (2006.01)
*B05B 7/16* (2006.01)

(58) Field of Classification Search
CPC ....... B05B 7/1686; B05B 7/1693; B05B 7/24; B05B 7/2486; B05B 7/2489–7/2497
USPC .................................................. 392/386–406
See application file for complete search history.

(56) References Cited

U.S. PATENT DOCUMENTS

| | | | | |
|---|---|---|---|---|
| 2005/0079074 | A1* | 4/2005 | Ishii | B01D 19/0031 417/423.4 |
| 2015/0013562 | A1 | 1/2015 | Scully | |
| 2015/0014430 | A1* | 1/2015 | Scully | A63J 5/025 239/8 |

FOREIGN PATENT DOCUMENTS

| | | | |
|---|---|---|---|
| CN | 204447335 | U | 7/2015 |
| GB | 640266 | A | 7/1950 |
| WO | 2009151375 | A1 | 12/2009 |
| WO | 2010009733 | A1 | 1/2010 |

* cited by examiner

STAGE SMOKE MACHINE WITH FAST SPRAY GAS COLUMN AND ELECTROMAGNETIC VALVE MODULE THEREOF

TECHNICAL FIELD

The present invention relates to a stage smoke machine, and particularly to a stage smoke machine with a fast spray gas column, which belongs to the field of stage effect equipment.

BACKGROUND ART

Existing stage smoke machines cannot deliver smoke oil to a heater so as to immediately spray the smoke so formed even after a controller sends a signal to drive an oil pump. Existing stage smoke machines cannot achieve a rapid response similar to that of stage carbon dioxide equipment spraying gas columns because starting the oil pump takes time. This causes a delay in the presentation of the stage visual effect, and thereby seriously affects the visual experience.

In a theatrical show, the faster the gas column is sprayed out, the better the effect. In order to achieve such a fast spray, a high-pressure gas tank is additionally provided between the heater and the oil pump, so that when there is a need for a smoke spraying effect, the high-pressure gas tank is synchronously turned on while starting the oil pump. Compressed air inside the high-pressure gas tank then quickly delivers smoke oil in the gas tank to the heater for heating and fast smoke-spraying. In that way, the desired visual effect is immediately presented on the stage.

However, whenever the high-pressure gas tank is released, a part of the gas will be mixed with the smoke oil and sprayed out of the machine. This in turn makes the amount of compressible gas in the tank smaller. And after multiple releases, the pressure generated by the smaller amount of gas in the tank is unable to deliver the smoke oil to the outside of the tank at a high speed. This results in slower smoke-spraying, which is to say, this is a failure of the high-pressure gas tank. Thereafter, the smoke is no longer quickly sprayed out, and only the smoke spraying effect of an ordinary smoke machine can be achieved.

SUMMARY OF THE INVENTION

A first object of the present invention is to provide a stage smoke machine with a fast spray gas column, which can rapidly spray smoke at the time it starts and which does not require regular maintenance.

A second object of the present invention is to provide an electromagnetic valve module which is compact in structure and easy to install and maintain.

The first object of the present invention is achieved by the following technical solution:

a stage smoke machine with a fast spray gas column, comprising an oil barrel, an oil pump, a gas tank, a first electromagnetic valve, a heater and a controller, an input end of the oil pump is in communication with the oil barrel through a pipeline, an output end of the oil pump is in communication with an input end of the first electromagnetic valve through a pipeline, and an output end of the first electromagnetic valve is in communication with an input end of the heater through a pipeline; an output end of the gas tank being in communication with the output end of the oil pump through a pipeline, and the output end of the gas tank being in communication with the input end of the first electromagnetic valve through a pipeline; and the oil pump, the first electromagnetic valve, the heater and a gas-filling device are all electrically connected to the controller, wherein the stage smoke machine further comprises a gas-filling device electrically connected to the controller, an output end of the gas-filling device being in communication with an input end of the gas tank through a pipeline, and when the gas in the gas tank is insufficient, the gas-filling device replenishes the gas tank with the gas.

A second electromagnetic valve, which is electrically connected to the controller, is provided between the gas-filling device and the gas tank, an output end of the second electromagnetic valve is in communication with an output end of a gas pump through a pipeline, and an input end of the second electromagnetic valve is in communication with the input end of the gas tank through a pipeline.

A third electromagnetic valve, which is electrically connected to the controller, is provided between the gas tank and the oil barrel, the output end of the gas tank is in communication with an input end of the third electromagnetic valve, and an input end of the third electromagnetic valve is in communication with the oil barrel through a pipeline, so as to form an oil drainage pipeline. When there is too little air and too much smoke oil in the gas tank, the smoke oil can be discharged through this oil drainage pipeline into the oil barrel.

A fourth electromagnetic valve further is provided between the heater and the oil barrel, the input end of the heater is in communication with an input end of the fourth electromagnetic valve through a pipeline, and an input end of the fourth electromagnetic valve is in communication with the oil barrel through a pipeline, so as to form an oil return pipeline.

The first electromagnetic valve, the second electromagnetic valve, the third electromagnetic valve and the fourth electromagnetic valve are all integrated into a base, forming an electromagnetic valve module; the base is provided with an oil pump interface, a heater interface, an oil barrel interface, a gas pump interface, a gas tank input end interface and a gas tank output end interface, and the input end of the first electromagnetic valve is in communication with the oil pump interface, the input end of the third electromagnetic valve and the output end of the gas tank at the same time; the output end of the first electromagnetic valve is respectively in communication with the heater interface and the input end of the fourth electromagnetic valve; the output end of the second electromagnetic valve is in communication with the gas pump interface, and the input end of the second electromagnetic valve is in communication with the gas tank input end interface; the input end of the third electromagnetic valve is in communication with the gas tank output end interface and the input end of the first electromagnetic valve at the same time, and the output end of the third electromagnetic valve is in communication with the oil barrel interface and the output end of the fourth electromagnetic valve at the same time.

The smoke machine is further provided with a high-speed gas flow producing apparatus electrically connected to the controller, the high-speed gas flow producing apparatus is located on one side of the heater, and a gas nozzle of the high-speed gas flow producing apparatus is oriented in the same direction as a gas nozzle of the heater.

The oil barrel, the oil pump, the gas tank, the heater, the gas replenishing device, the pipelines, the first electromagnetic valve, the second electromagnetic valve, the third electromagnetic valve, the fourth electromagnetic valve and the controller are all integrated within a casing.

The oil barrel, the oil pump, the gas tank, the heater, the gas replenishing device, the pipelines, the high-speed gas flow producing apparatus, the first electromagnetic valve, the second electromagnetic valve, the third electromagnetic valve, the fourth electromagnetic valve and the controller may be all integrated within a casing.

As there are many parts, pipelines and lines in the smoke machine, the layout is likely to be loose and messy, is not easy to inspect and maintain, and is not conducive to saving space. In order to make the installation of the parts in the smoke machine more compact and reduce the volume of the smoke machine, the second object of the present invention is achieved by the following technical solution:

an electromagnetic valve module, which comprises a base and first and second electromagnetic valves mounted on the base, wherein the base is provided with an oil pump interface, a heater interface, a gas pump interface, a gas tank input end interface and a gas tank output end interface, and the input end of the first electromagnetic valve is in communication with the oil pump interface and the gas tank output end interface through conduits at the same time; the output end of the first electromagnetic valve is in communication with the heater interface through a conduit; and the output end of the second electromagnetic valve is in communication with the oil pump interface through a conduit, and the input end of the second electromagnetic valve is in communication with the gas tank input end interface through a conduit. During the installation process, the oil pump interface is in communication with the output end of the oil pump, the input end of the oil pump is in communication with the output end of the oil barrel, the heater interface is in communication with the output end of the heater, the gas pump interface is in communication with the output end of the gas pump, the gas tank input end interface is in communication with the input end of the gas tank, and the gas tank output end interface is in communication with the output end of the gas tank.

Furthermore, the base further comprises a third electromagnetic valve and an oil barrel interface which are mounted on the base, and the input end of the first electromagnetic valve is in communication with the oil pump interface, the input end of the third electromagnetic valve and the gas tank output end interface through conduits at the same time; and the output end of the third electromagnetic valve is in communication with the oil barrel interface through a conduit. During the installation process, the oil pump interface is in communication with the output end of the oil pump, the input end of the oil pump is in communication with the output end of the oil barrel, the heater interface is in communication with the output end of the heater, the oil barrel interface is in communication with the oil barrel, the gas pump interface is in communication with the output end of the gas pump, the gas tank input end interface is in communication with the input end of the gas tank, and the gas tank output end interface is in communication with the output end of the gas tank.

Furthermore, the base further comprises a fourth electromagnetic valve mounted on the base, and the output end of the first electromagnetic valve is in communication with the heater interface and the input end of the fourth electromagnetic valve through conducts at the same time; and the output end of the fourth electromagnetic valve is in communication with the oil barrel interface through a conduit. During the installation process, the oil pump interface is in communication with the output end of the oil pump, the input end of the oil pump is in communication with the output end of the oil barrel, the heater interface is in communication with the output end of the heater, the oil barrel interface is in communication with the oil barrel, the gas pump interface is in communication with the output end of the gas pump, the gas tank input end interface is in communication with the input end of the gas tank, and the gas tank output end interface is in communication with the output end of the gas tank.

All the conduits are located in the base and are integrally formed with the base.

Valve seats of the electromagnetic valves are formed integrally with the base, and main valve portions of the electromagnetic valves are connected by thread to, or fastened to, or snap-fitted with, the valve seats in a sealed manner.

The base may also be a box-type base, and the electromagnetic valves are all installed in the box to form a regular module.

The base may also have a hollow cavity, and the conduits communicating the electromagnetic valves and the interfaces are mounted in the cavity.

The base is an aluminum base or a copper base or a stainless-steel base or an alloy base, or is made of another material such as plastic.

For ease of installation, the interfaces of the base are threaded interfaces, or snap-fitting interfaces, or fastening interfaces.

The present invention has the advantages as follows with respect to the prior art: (1) a gas-filling device is additionally provided for the gas tank, and cooperates with the oil pump such that adequate gas and pressure are always maintained in the gas tank to ensure that a high level, gas column stage effect can be quickly presented once the smoke machine is started; (2) an oil drainage pipeline is additionally provided between the gas tank and the oil barrel, through which the excess smoke oil can be discharged into the oil barrel when the gas tank needs more compressible air; (3) an oil return pipeline is additionally provided between the heater and the oil barrel to collect the oil retained in the heater conduit when the machine is shut down, which is conducive to the re-use of residual oil, and will not only prevent the heater from spraying smoke as a result of waste heat after shutdown (which hinders immediate stoppage), but will also prevent the residual oil from flowing out of the gas nozzle of the cooled heater and dropping onto the stage during shut-down (which leads to a slippery ground); (4) the electromagnetic valves are integrated together to form an electromagnetic valve module, which solves the defects that the layout of the existing smoke machine is messy and inconvenient for inspection and maintenance, makes the installation of components in the smoke machine more reasonable and compact, and saves the installation space; and (5) a high-speed gas flow producing apparatus is additionally provided, which greatly enhances the directional flow of the air near the gas nozzle of the heater and drives the sprayed smoke to move more rapidly in the designed direction, resulting in a more stunning visual effect.

DETAILED DESCRIPTION

The present invention will be further described below in conjunction with the accompanying drawings and embodiments.

First Embodiment

Figure 1:
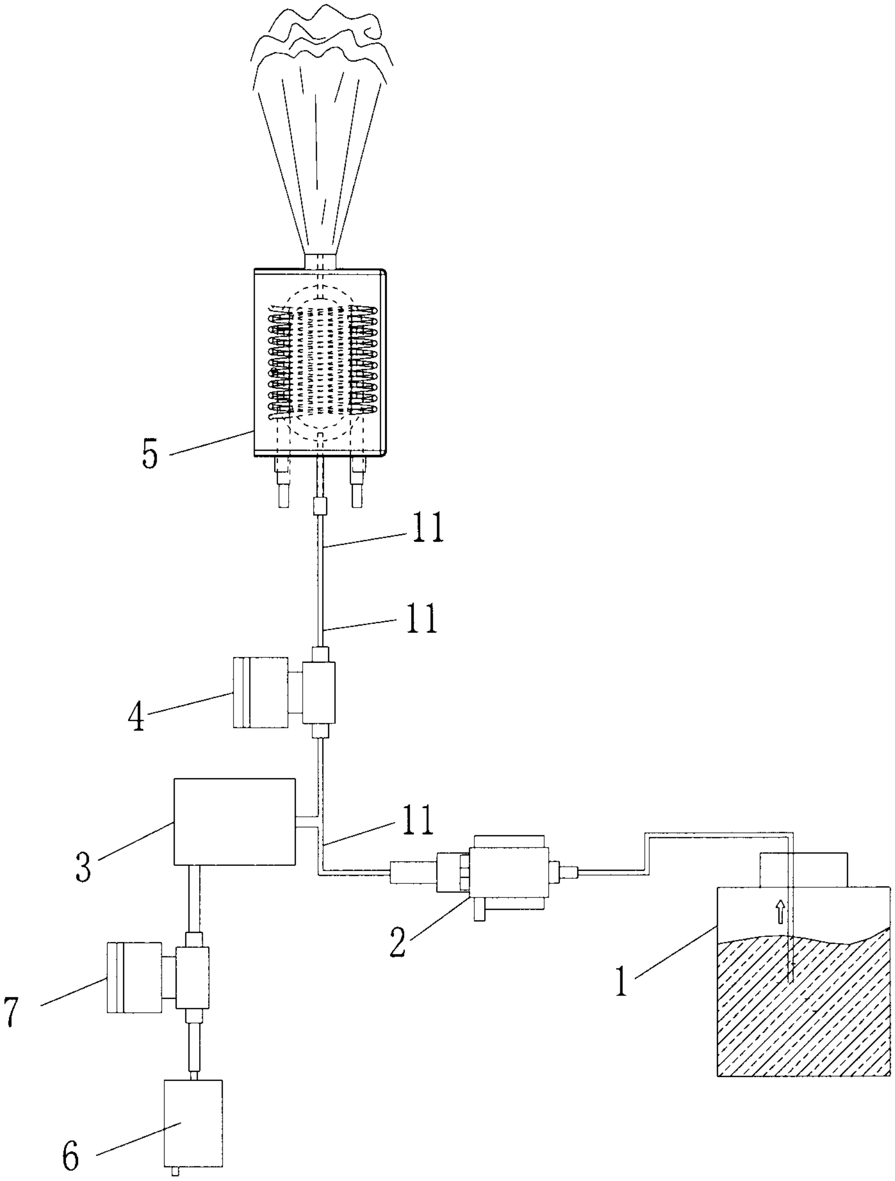
FIG. 1 is a structural schematic view of a first embodiment of a smoke machine of the present invention.

The structure of a stage smoke machine with a fast sprayed gas column of this first embodiment is shown in FIG. 1, which comprises an oil barrel 1, an oil pump 2, a gas tank 3, a first electromagnetic valve 4, a heater 5, a gas pump 6, a second electromagnetic valve 7 and a controller (not shown); an input end of the oil pump 2 is in communication with the oil barrel 1 through a pipeline 11, an output end of the oil pump 2 is in communication with an input end of the first electromagnetic valve 4 through a pipeline 11, and an output end of the first electromagnetic valve 4 is in communication with an input end of the heater 5 through a pipeline 11; an output end of the gas tank 3 is in communication with the output end of the oil pump 2 through a pipeline 11, the output end of the gas tank 3 is in communication with the input end of the first electromagnetic valve 4 through a pipeline 11, an output end of the second electromagnetic valve 7 is in communication with an output end of the gas pump 6 through a pipeline 11, an input end of the second electromagnetic valve 7 is in communication with the input end of the gas tank 3 through a pipeline 11, and when the air in the gas tank 3 runs out, rendering the pressure therein insufficient, the air pump 6 supplements the air to the gas tank 3 and pressurize same, to form a pressure sufficient to drive the rapid spray of the smoke oil. The oil pump 2, the first electromagnetic valve 4, the heater 5, the gas pump 6 and the second electromagnetic valve 7 are all electrically connected to the controller.

The working principle of the stage smoke machine with a fast spray gas column of this embodiment is that, when the smoke machine is powered on, the heater 5 starts heating, and when a set temperature is reached, the heater is automatically kept at the set temperature. The second electromagnetic valve 7 is controlled by the controller to be opened and the first electromagnetic valve 4 to be closed once the smoke machine is powered on, the gas pump 6 starts to input a certain quantity of air into the gas tank 3, and then the second electromagnetic valve 7 is controlled by the controller to be closed and the gas pump 6 to be turned off. Then, the oil pump 2 is controlled by the controller to start working, the oil pump 2 draws the smoke oil from the oil barrel 1 and presses same into the gas tank 3, and the air in the gas tank 3 is compressed by the incoming smoke oil to form the compressed air, and when the pressure in the tank reaches the set value, the oil pump 2 is turned off and the smoke machine enters a standby state.

When the smoke is to be sprayed as required, the oil pump 2 is controlled by the controller to start; meanwhile, the first electromagnetic valve 4 is in a conductive state, the compressed air inside the gas tank 3 quickly supplies the smoke oil in the gas tank 3 to the heater 5, and the oil pump 2 continues supplying the smoke oil to the heater 5 so that more smoke oil can be atomized more quickly into smoke and sprayed out. When the spraying of the smoke is ended, the oil pump 2 is controlled by the controller to be turned off, and the first electromagnetic valve 4 is closed at the same time.

Second Embodiment

Figure 2:
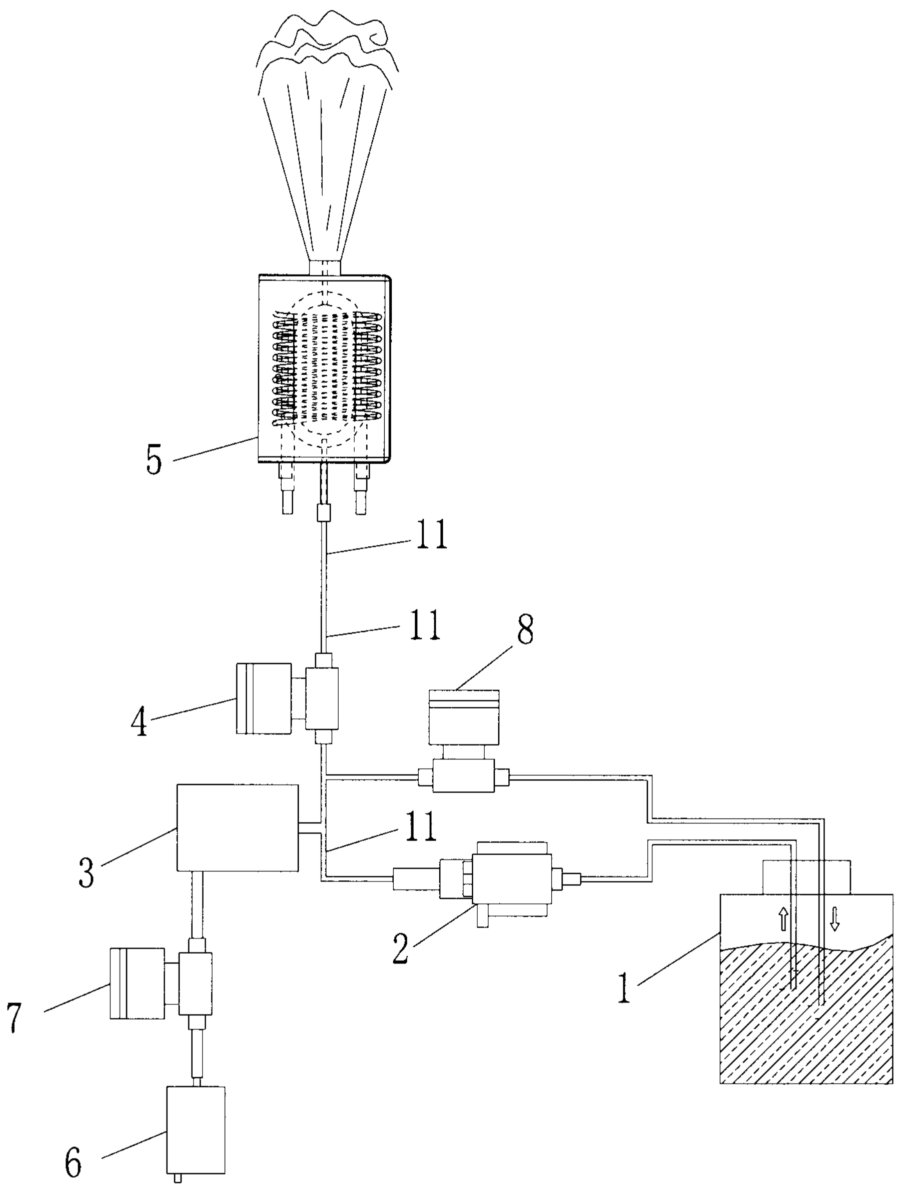
FIG. 2 is a structural schematic view of a second embodiment of the smoke machine of the present invention.

The structure of a stage smoke machine with a fast sprayed gas column of this second embodiment is shown in FIG. 2, which comprises an oil barrel 1, an oil pump 2, a gas tank 3, a first electromagnetic valve 4, a heater 5, a gas pump 6, a second electromagnetic valve 7, a third electromagnetic valve 8 and a controller (not shown); an input end of the oil pump 2 is in communication with the oil barrel 1 through a pipeline 11, an output end of the oil pump 2 is in communication with an input end of the first electromagnetic valve 4 through a pipeline 11, and an output end of the first electromagnetic valve 4 is in communication with an input end of the heater 5 through a pipeline 11; an output end of the gas tank 3 is in communication with the output end of the oil pump 2 through a pipeline 11, the output end of the gas tank 3 is in communication with the input end of the first electromagnetic valve 4 through a pipeline 11, an output end of the second electromagnetic valve 7 is in communication with an output end of the gas pump 6 through a pipeline 11, an input end of the second electromagnetic valve 7 is in communication with the input end of the gas tank 3 through a pipeline 11, and when the pressure in the gas tank 3 is insufficient, the air pump 6 supplements the air to the gas tank 3; the third electromagnetic valve 8 is located between the gas tank 3 and the oil barrel 1, the output end of the gas tank 3 is in communication with an input end of the third electromagnetic valve 8 through a pipeline 11, and an output end of the third electromagnetic valve 8 is in communication with the oil barrel 1 through a pipeline 11, so as to form an oil drainage pipeline, through which the smoke oil can be discharged into the oil barrel 1 when there is too much smoke oil in the gas tank 3. The oil pump 2, the first electromagnetic valve 4, the heater 5, the gas pump 6, the second electromagnetic valve 7 and the third electromagnetic valve 8 are all electrically connected to the controller.

The working principle of the stage smoke machine with a fast spray gas column of this embodiment is that, when the smoke machine is powered on, the heater 5 starts heating, and when a set temperature is reached, the heater is automatically kept at the set temperature. The second electromagnetic valve 7 and the third electromagnetic valve 8 are controlled by the controller to be opened and the first electromagnetic valve 4 to be closed once the smoke machine is powered on, the gas pump 6 then starts to input a certain quantity of air into the gas tank 3 to empty or substantially empty the smoke oil in the gas tank 3 such that only air exists in the gas tank 3 as far as possible, and then the first electromagnetic valve 4, the second electromagnetic valve 7 and the third electromagnetic valve 8 is controlled by the controller to be closed and the gas pump 6 to be turned off. Then, the oil pump 2 is controlled by the controller to start working, the oil pump 2 draws the smoke oil from the oil barrel 1 and presses same into the gas tank 3, and the air in the gas tank 3 is compressed by the incoming smoke oil to form the compressed air, and when the pressure in the tank reaches the set value, the oil pump 2 is turned off and the smoke machine enters a standby state.

When the smoke is to be sprayed as required, the oil pump 2 is controlled by the controller to start; meanwhile, the first electromagnetic valve 4 is in a conductive state, the compressed air inside the gas tank 3 quickly supplies the smoke oil in the gas tank 3 to the heater 5, and the oil pump continues supplying the smoke oil to the heater 5 so that more smoke oil can be atomized more quickly into smoke and sprayed out. When the spraying of the smoke is ended, the oil pump 2 is controlled by the controller to be turned off, and the first electromagnetic valve 4 is closed at the same time.

Third Embodiment

Figure 3:
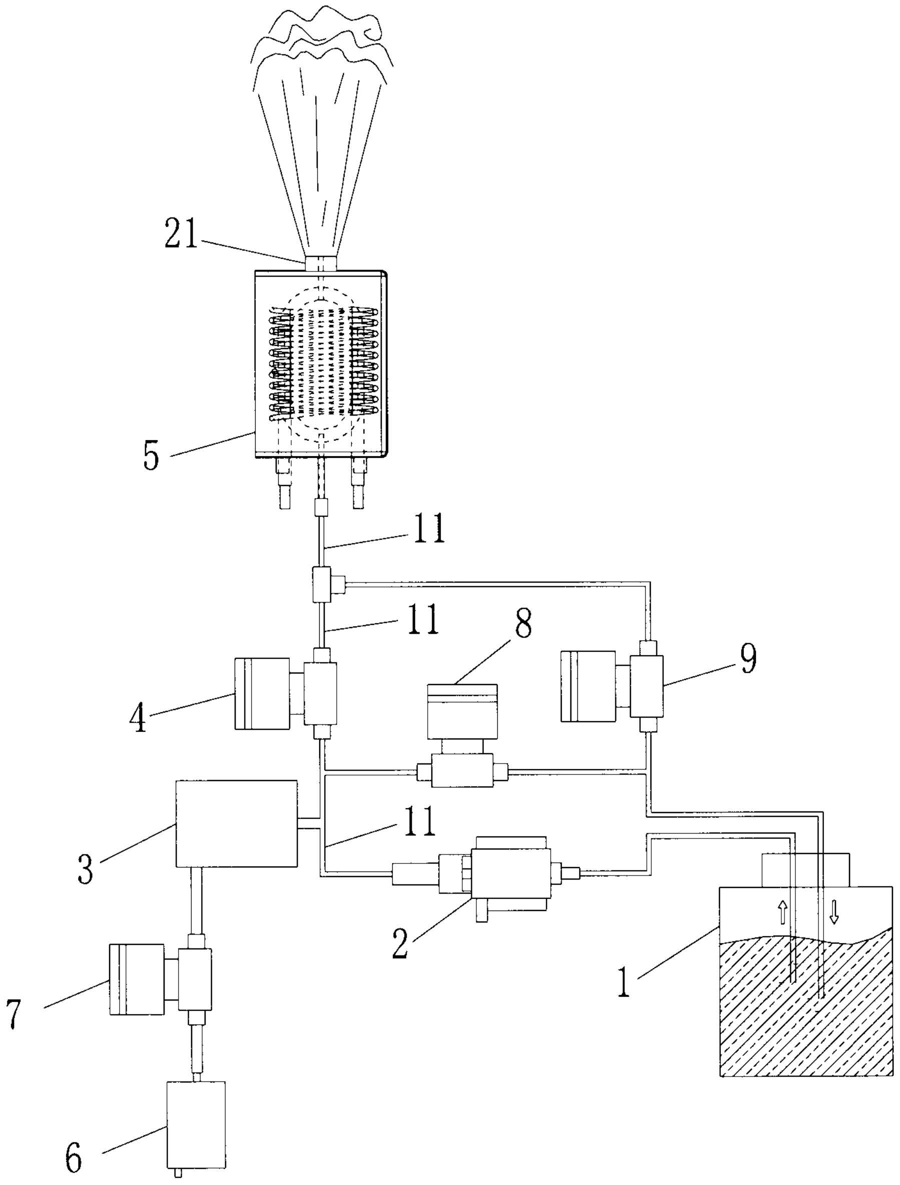
FIG. 3 is a structural schematic view of a third embodiment of the smoke machine of the present invention.

The structure of a stage smoke machine with a fast spray gas column of this third embodiment is shown in FIG. 3, which comprises an oil barrel 1, an oil pump 2, a gas tank 3, a first electromagnetic valve 4, a heater 5, a gas pump 6, a second electromagnetic valve 7, a third electromagnetic valve 8, a fourth electromagnetic valve 9 and a controller (not shown); an input end of the oil pump 2 is in communication with the oil barrel 1 through a pipeline 11, an output end of the oil pump 2 is in communication with an input end of the first electromagnetic valve 4 through a pipeline 11, and an output end of the first electromagnetic valve 4 is in communication with an input end of the heater 5 through a pipeline 11; an output end of the gas tank 3 is in communication with the output end of the oil pump 2 through a pipeline 11, the output end of the gas tank 3 is in communication with the input end of the first electromagnetic valve 4 through a pipeline 11, an output end of the second electromagnetic valve 7 is in communication with an output end of the gas pump 6 through a pipeline 11, an input end of the second electromagnetic valve 7 is in communication with the input end of the gas tank 3 through a pipeline 11, and when the pressure in the gas tank 3 is insufficient, the air pump 6 supplements the air to the gas tank 3; the third electromagnetic valve 8 is located between the gas tank 3 and the oil barrel 1, the output end of the gas tank 3 is in communication with an input end of the third electromagnetic valve 8 through a pipeline 11, and an output end of the third electromagnetic valve 8 is in communication with the oil barrel 1 through a pipeline 11, so as to form an oil drainage pipeline, through which the smoke oil can be discharged into the oil barrel 1 when there is too much smoke oil in the gas tank 3; a fourth electromagnetic valve is located between the heater 5 and the oil barrel 1, the input end of the heater 5 is in communication with an input end of the fourth electromagnetic valve 9 through a pipeline 11, and an input end of the fourth electromagnetic valve 9 is in communication with the oil barrel 1 through a pipeline 11, so as to form an oil return pipeline. The oil pump 2, the first electromagnetic valve 4, the heater 5, the gas pump 6, the second electromagnetic valve 7, the third electromagnetic valve 8 and the fourth electromagnetic valve 9 are all electrically connected to the controller.

The first electromagnetic valve 4, the second electromagnetic valve 7, the third electromagnetic valve 8 and the fourth electromagnetic valve 9 are all integrated into a base 12, the base 12 is provided with an oil pump interface 13, a heater interface 14, an oil barrel interface 15, a gas pump interface 16, a gas tank input end interface 17 and a gas tank output end interface 18, and the input end of the first electromagnetic valve 4 is in communication with the oil pump interface 13, the input end of the third electromagnetic valve 8 and the output end of the gas tank 3 at the same time; the output end of the first electromagnetic valve 4 is respectively in communication with the heater interface 14 and the input end of the fourth electromagnetic valve 9; the output end of the second electromagnetic valve 7 is in communication with the gas pump interface 16, and the input end of the second electromagnetic valve 7 is in communication with the gas tank input end interface 17; and the input end of the third electromagnetic valve 8 is in communication with the gas tank output end interface 18 and the input end of the first electromagnetic valve 4 at the same time, and the output end of the third electromagnetic valve 8 is in communication with the oil barrel interface 15 and the output end of the fourth electromagnetic valve 9 at the same time. During the installation process, the oil pump interface 13 is in communication with the output end of the oil pump, the heater interface 14 is in communication with the output end of the heater 5, the oil barrel interface 15 is in communication with the oil barrel 1, the gas pump interface 16 is in communication with the output end of the gas pump 6, the gas tank input end interface 17 is in communication with the input end of the gas tank 3, and the gas tank output end interface 18 is in communication with the output end of the gas tank 3.

The working principle of the stage smoke machine with a fast spray gas column of this embodiment is that:

when the smoke machine is powered on, the heater 5 starts heating, and when a set temperature is reached, the heater is automatically kept at the set temperature. The second electromagnetic valve 7 and the third electromagnetic valve 8 are controlled by the controller to be opened and the first electromagnetic valve 4 and the fourth electromagnetic valve 9 to be closed once the smoke machine is powered on, the gas pump 6 then starts to input a certain quantity of air into the gas tank 3 to empty the smoke oil in the gas tank 3 such that only air exists in the gas tank 3, and then the first electromagnetic valve 4, the second electromagnetic valve 7, the third electromagnetic valve 8 and the fourth electromagnetic valve 9 are controlled by the controller to be closed and the gas pump 6 to be turned off. Then, the oil pump 2 is controlled by the controller to start working, the oil pump 2 draws the smoke oil from the oil barrel 1 and presses same into the gas tank 3, and the air in the gas tank 3 is compressed by the incoming smoke oil to form the compressed air, and when the pressure in the tank reaches the set value, the oil pump 2 is turned off and the smoke machine enters a standby state.

When the smoke is to be sprayed as required, the oil pump 2 is controlled by the controller to start; meanwhile, the first electromagnetic valve 4 is in a conductive state, the compressed air inside the gas tank 3 quickly supplies the smoke oil in the gas tank 3 to the heater 5, and the oil pump continues supplying the smoke oil to the heater 5 so that more smoke oil can be atomized more quickly into smoke and sprayed out. When the spraying of the smoke is ended, the oil pump 2 is controlled by the controller to be turned off, the first electromagnetic valve 4 is closed at the same time, and the electromagnetic valve 9 is controlled to be in the open state. The pressurized smoke oil inside the pipeline 11 and the heater 5 are returned to the oil barrel 1, and then the fourth electromagnetic valve 9 is controlled to be quickly closed; and since the smoke oil inside the conduits have been emptied, the residual smoke is well prevented from spraying out of a gas nozzle 21 of the heater to affect the visual effect, and the residual smoke oil is prevented from flowing out of the gas nozzle 21 of the heater.

Fourth Embodiment

Figure 4:
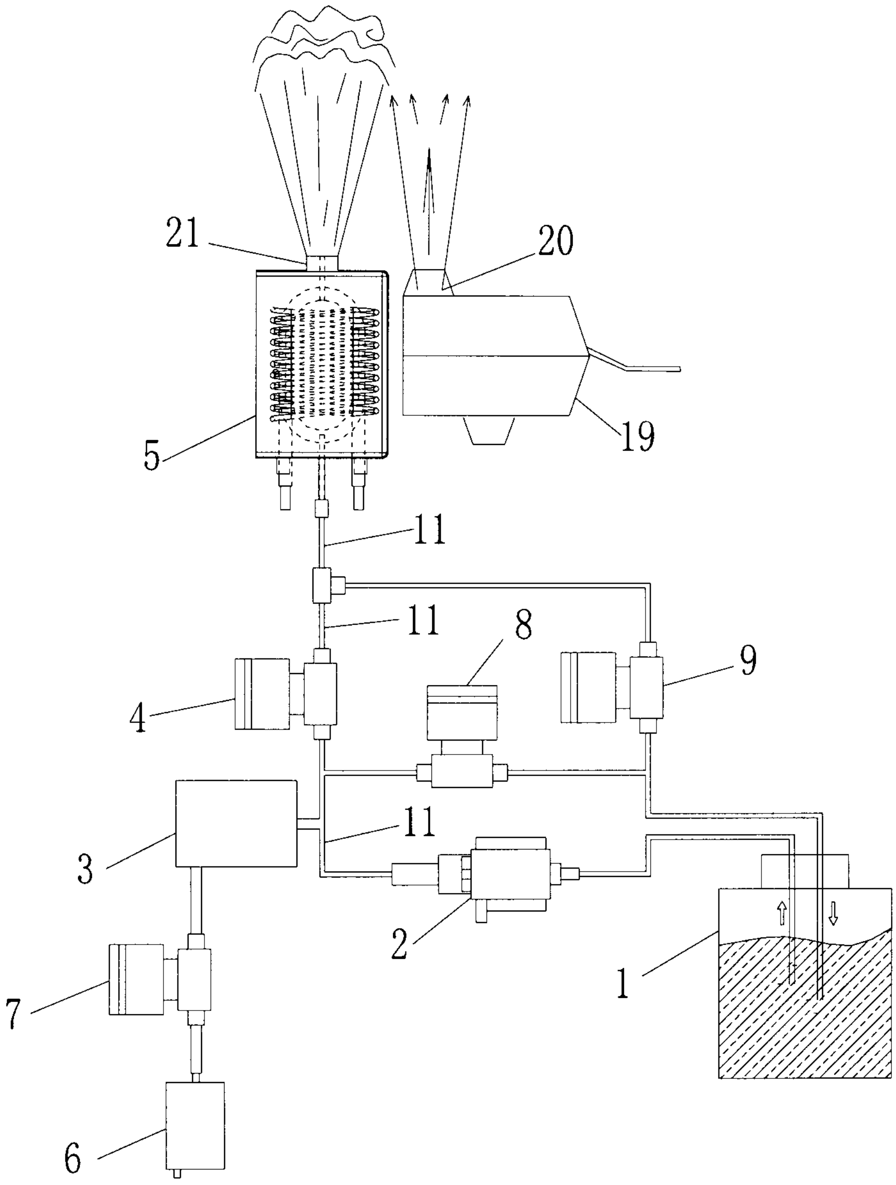
FIG. 4 is a structural schematic view of a fourth embodiment of the smoke machine of the present invention.

The structure as shown in FIG. 4 differs from the third embodiment in that, a stage smoke machine with a fast spray gas column of this embodiment is further provided with a high-speed gas flow producing apparatus 19 electrically connected to the controller, the high-speed gas flow producing apparatus 19 is located on one side of the heater 5, and a gas nozzle 20 of the high-speed gas flow producing apparatus 19 is oriented in the same direction as the gas nozzle 21 of the heater.

The high-speed gas flow producing apparatus 19 is started before or at the same time as the smoke machine sprays the smoke out, the gas flow is sprayed out of the gas nozzle 20 of the apparatus at a high speed; and when the smoke machine sprays the smoke out, the smoke will be driven by the adjacent high-speed gas flow to be sprayed upward, forming a more stunning visual effect.

Fifth Embodiment

Figure 5:
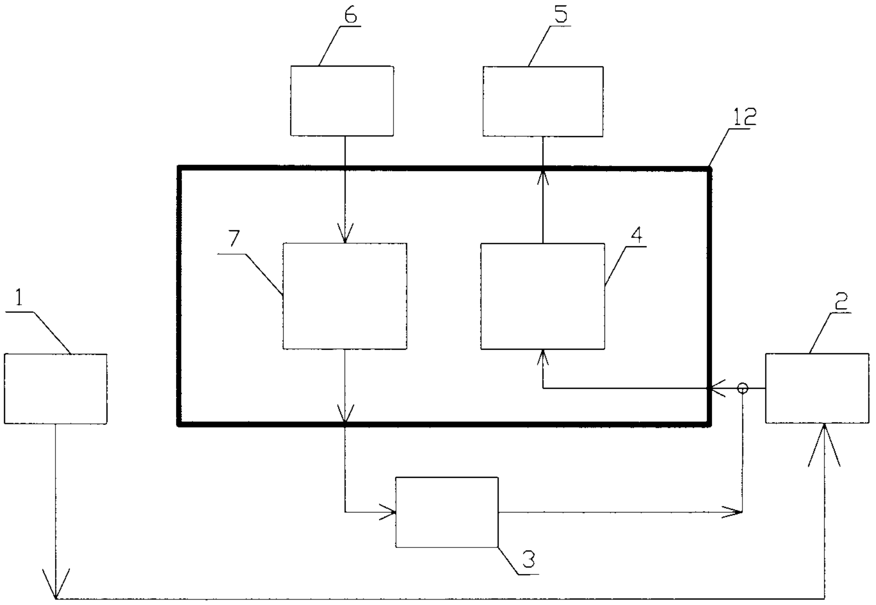
FIG. 5 is a schematic diagram of an electromagnetic valve module of a fifth embodiment.
Figure 6:
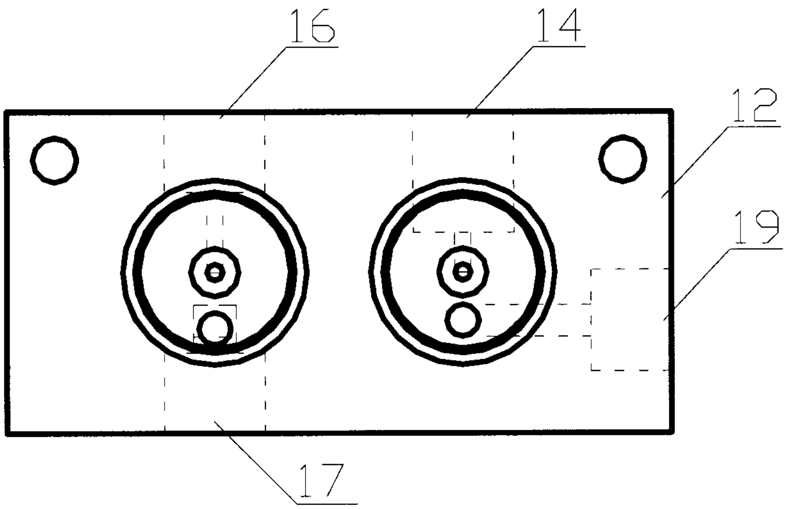
FIG. 6 is a perspective view of a base of the electromagnetic valve module of the fifth embodiment.
Figure 7:
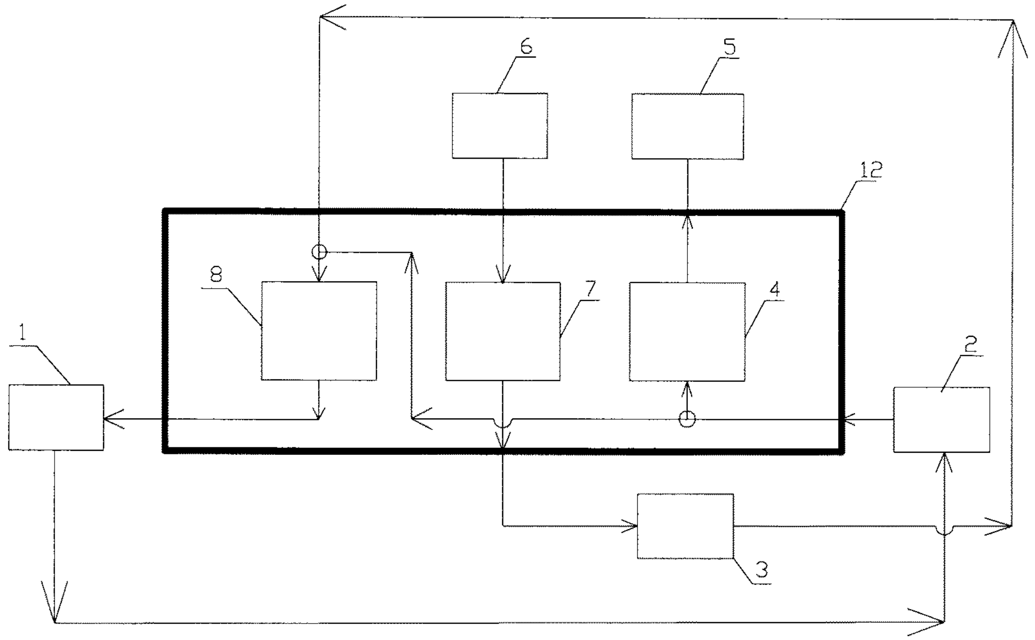
FIG. 7 is a schematic diagram of an electromagnetic valve module of a sixth embodiment.
Figure 8:
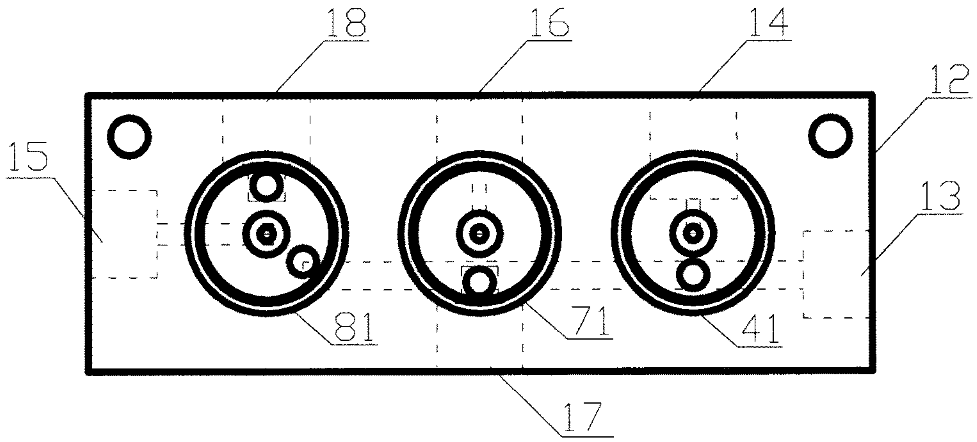
FIG. 8 is a perspective view of a base of the electromagnetic valve module of the sixth embodiment.
Figure 9:
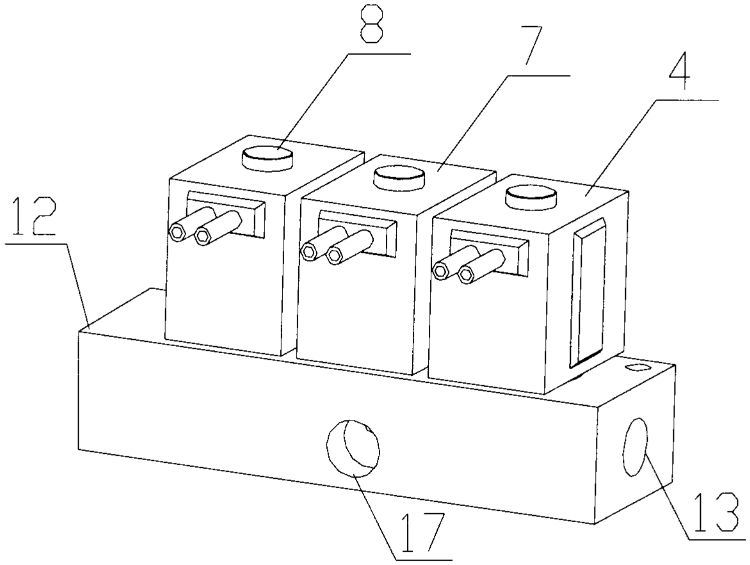
FIG. 9 is a schematic view of the electromagnetic valve module of the sixth embodiment.
Figure 10:
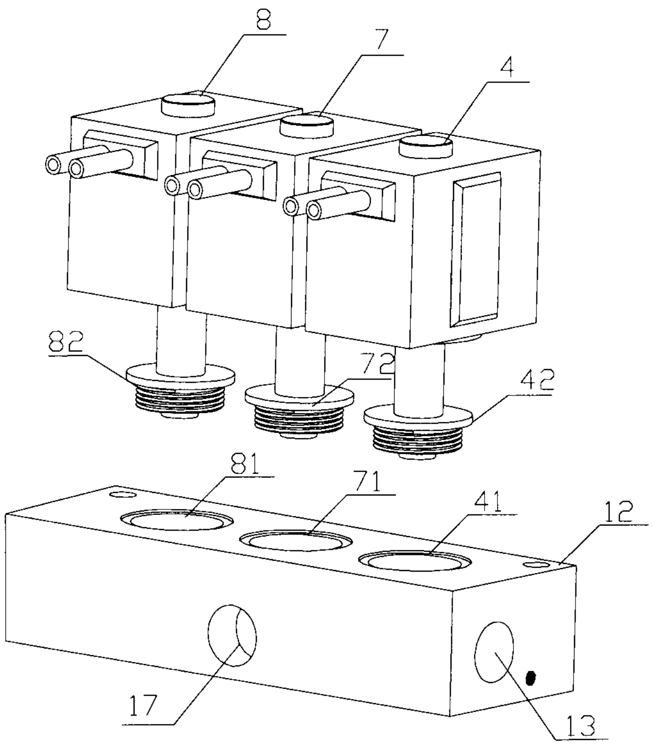
FIG. 10 is a partial exploded view of FIG. 9.
Figure 11:
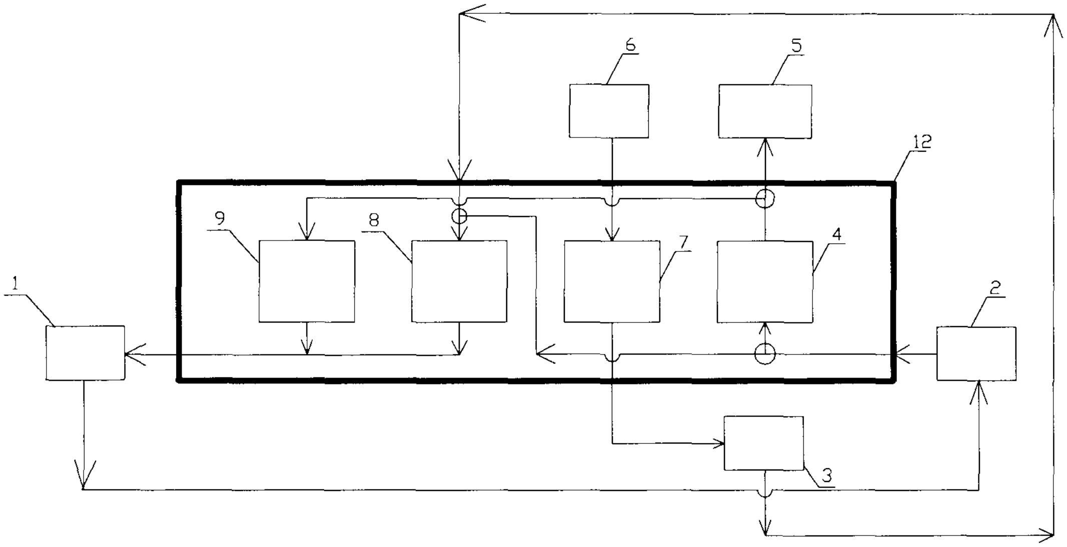
FIG. 11 is a schematic diagram of an electromagnetic valve module of a seventh embodiment.
Figure 12:
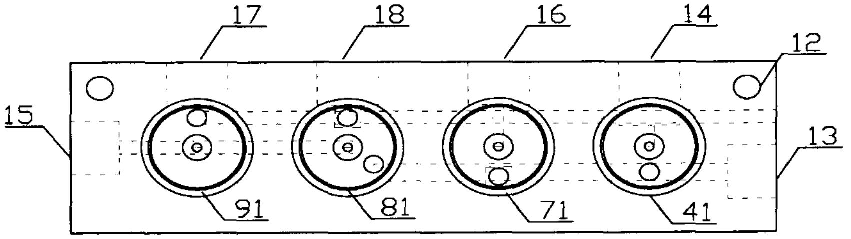
FIG. 12 is a perspective view of a base of the electromagnetic valve module of the seventh embodiment.
Figure 13:
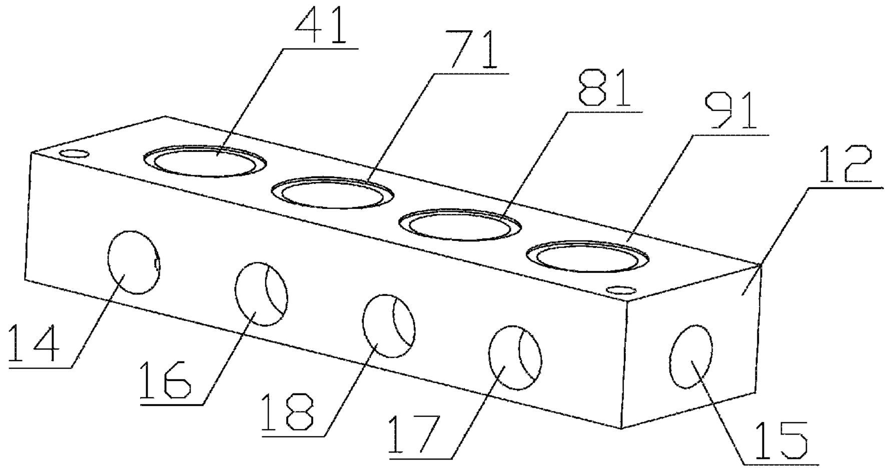
FIG. 13 is a structural schematic view of the base of the electromagnetic valve module of the seventh embodiment.
Figure 14:
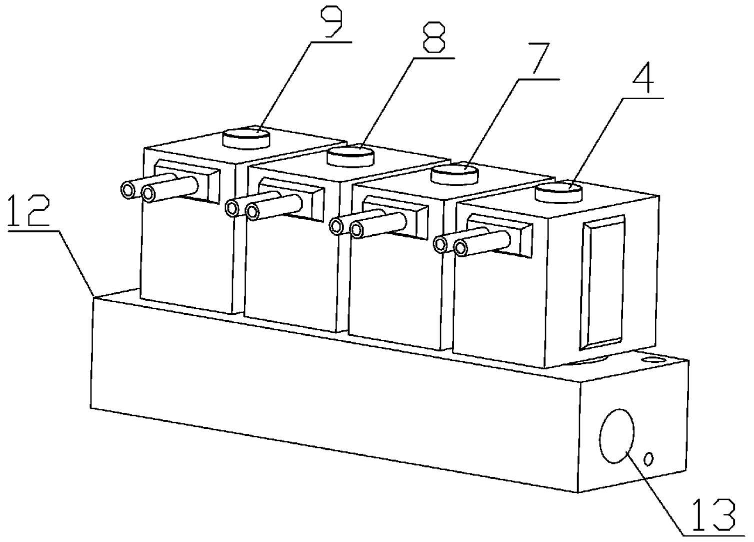
FIG. 14 is a structural schematic view of the electromagnetic valve module of the seventh embodiment.
Figure 15:
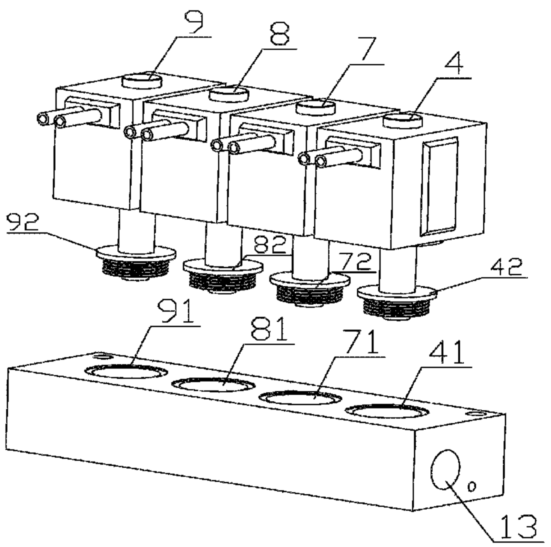
FIG. 15 is a partial exploded view of FIG. 14.

The structure of an electromagnetic valve module of this embodiment is as shown in FIGS. 5 and 6, which comprises a base 12 and first and second electromagnetic valves 4 and 7 mounted on an end face of the base 12, wherein the base is provided with an oil pump interface, a heater interface 14, a gas pump interface 16, a gas tank input end interface 17 and a gas tank output end interface, wherein the input end of the first electromagnetic valve 4 is in communication with the oil pump interface and the gas tank output end interface through conduits at the same time, and the oil pump interface and the gas tank output end interface may be separately arranged, or may be combined into an oil and gas interface 19; the output end of the first electromagnetic valve 4 is in communication with the heater interface 14 through a conduit; and the output end of the second electromagnetic valve 7 is in communication with the oil pump interface 16 through a conduit, and the input end of the second electromagnetic valve 7 is in communication with the gas tank input end interface 17 through a conduit of the valve seat.

The base 12 has a hollow cavity, which is in communication with the output and input ends of the electromagnetic valves, and the conduits are all mounted in the cavity.

The base 12 is a copper base, and the interfaces of the base 12 are internally threaded.

During the installation process, the oil pump interface 13 is in communication with the output end of the oil pump 2, the input end of the oil pump 2 is in communication with the output end of the oil barrel 1, the heater interface 14 is in communication with the input end of the heater 5, the gas pump interface 16 is in communication with the output end of the gas pump 6, the gas tank input end interface 17 is in communication with the input end of the gas tank 3, and the gas tank output end interface 18 is in communication with the output end of the gas tank 3.

Sixth Embodiment

The structure of an electromagnetic valve module of this embodiment is as shown in FIGS. 7, 8, 9 and 10, which comprises a base 12, and a first electromagnetic valve 4, a second electromagnetic valve 7 and a third electromagnetic valve 8 which are mounted on an end face of the base 12, wherein the base is provided with an oil pump interface 13, a heater interface 14, an oil barrel interface 15, a gas pump interface 16, a gas tank input end interface 17 and a gas tank output end interface 18, the input end of the first electromagnetic valve 4 is in communication with the oil pump interface 13, the input end of the third electromagnetic valve 8 and the gas tank output end interface 18 through conduits at the same time; the output end of the first electromagnetic valve 4 is in communication with the heater interface 14 through a conduit; and the output end of the second electromagnetic valve 7 is in communication with the oil pump interface 16 through a conduit, and the input end of the second electromagnetic valve 7 is in communication with the gas tank input end interface 17 through a conduit; the output end of the third electromagnetic valve 8 is in communication with the oil barrel interface 15 through a conduit; all the conduits are located in the base 12 and are integrally formed with the base 12; a valve seat 41 of the first electromagnetic valve 4, a valve seat 71 of the second electromagnetic valve 7 and a valve seat 81 of the third electromagnetic valve 8 are all integrally formed with the base 12, and main valve portions 42, 72 and 82 of the electromagnetic valves 4, 7 and 8 are snap-fitted with the corresponding valve seats 41, 71 and 81 in a sealed manner; and the base 12 is an aluminum alloy base, and the interfaces of the base 12 are internally threaded.

During the installation process, the oil pump interface 13 is in communication with the output end of the oil pump 2, the input end of the oil pump 2 is in communication with the output end of the oil barrel 1, the heater interface 14 is in communication with the input end of the heater 5, the oil barrel interface 15 is in communication with the oil barrel 1, the gas pump interface 16 is in communication with the output end of the gas pump 6, the gas tank input end interface 17 is in communication with the input end of the gas tank 3, and the gas tank output end interface 18 is in communication with the output end of the gas tank 3.

Seventh Embodiment

The structure of an electromagnetic valve module of this embodiment is as shown in FIGS. 11, 12, 13, 14 and 15, which comprises a base 12, and a first electromagnetic valve 4, a second electromagnetic valve 7, a third electromagnetic valve 8 and a fourth electromagnetic valve 9 which are mounted on an end face of the base 12, wherein the base is provided with an oil pump interface 13, a heater interface 14, an oil barrel interface 15, a gas pump interface 16, a gas tank input end interface 17 and a gas tank output end interface 18; the input end of the first electromagnetic valve 4 is in communication with the oil pump interface 13, the input end of the third electromagnetic valve 8 and the gas tank output end interface 18 through conduits at the same time; the output end of the first electromagnetic valve 4 is in communication with the heater interface 14 and the input end of the fourth electromagnetic valve 9 through conduits at the same time; and the output end of the fourth electromagnetic valve is in communication with the oil barrel interface 15 through a conduit; the output end of the second electromagnetic valve 7 is in communication with the oil pump interface 16 through a conduit, and the input end of the second electromagnetic valve 7 is in communication with the gas tank input end interface 17 through a conduit; the output end of the third electromagnetic valve 8 is in communication with the oil barrel interface 15 through a conduit; all the conduits are located in the base 12 and are integrally formed with the base 12; a valve seat 41 of the first electromagnetic valve 4, a valve seat 71 of the second electromagnetic valve 7, a valve seat 81 of the third electromagnetic valve 8 and a valve seat 91 of the fourth electromagnetic valve 9 are all integrally formed with the base 12, and main valve portions 42, 72, 82, 92 of the electromagnetic valves 4, 7, 8 and 9 are threadedly connected to the corresponding valve seats 41, 71, 81, 91 in a sealed manner; and the base 12 is an aluminum alloy base, and the interfaces of the base 12 are internally threaded.

During the installation process, the oil pump interface 13 is in communication with the output end of the oil pump 2, the input end of the oil pump 2 is in communication with the output end of the oil barrel 1, the heater interface 14 is in communication with the input end of the heater 5, the oil barrel interface 15 is in communication with the oil barrel 1, the gas pump interface 16 is in communication with the output end of the gas pump 6, the gas tank input end interface 17 is in communication with the input end of the gas tank 3, and the gas tank output end interface 18 is in communication with the output end of the gas tank 3.

The present invention is not limited to the above embodiments, and it should be noted that several variations can also be made by a person of ordinary skill in the art without departing from the principle of the present invention, which all fall within the scope of protection of the present invention.

The invention claimed is:

1. A stage smoke machine with a fast spray gas column, comprising an oil barrel, an oil pump, a gas tank, a first electromagnetic valve, a heater and a controller, an input end of the oil pump is in communication with the oil barrel through a pipeline, an output end of the oil pump is in communication with an input end of the first electromagnetic valve through a pipeline, and an output end of the first electromagnetic valve is in communication with an input end of the heater through a pipeline;

an output end of the gas tank being in communication with the output end of the oil pump through a pipeline, and the output end of the gas tank being in communication with the input end of the first electromagnetic valve through a pipeline; and the oil pump, the first electromagnetic valve, the heater and a gas-filling device are all electrically connected to the controller, further comprising a gas-filling device electrically connected to the controller, an output end of the gas-filling device being in communication with an input end of the gas tank through a pipeline, and further comprising a second electromagnetic valve, which is electrically connected to the controller, is provided between the gas-filling device and the gas tank, an output end of the second electromagnetic valve is in communication with an output end of a gas pump through a pipeline, and an input end of the second electromagnetic valve is in communication with the input end of the gas tank through a pipeline.

2. The stage smoke machine with a fast spray gas column according to claim 1, characterized in that a third electromagnetic valve, which is electrically connected to the controller, is provided between the gas tank and the oil barrel, the output end of the gas tank is in communication with an input end of the third electromagnetic valve, and an input end of the third electromagnetic valve is in communication with the oil barrel through a pipeline, so as to form an oil drainage pipeline.

3. The stage smoke machine with a fast spray gas column according to claim 2, characterized in that a fourth electromagnetic valve further is provided between the heater and the oil barrel, the input end of the heater is in communication with an input end of the fourth electromagnetic valve through a pipeline, and an input end of the fourth electromagnetic valve is in communication with the oil barrel through a pipeline, so as to form an oil return pipeline.

4. The stage smoke machine with a fast spray gas column according to claim 3, characterized in that the first electromagnetic valve, the second electromagnetic valve, the third electromagnetic valve and the fourth electromagnetic valve are all integrated into a base, forming an electromagnetic valve module; the base is provided with an oil pump interface, a heater interface, an oil barrel interface, a gas pump interface, a gas tank input end interface and a gas tank output end interface, and the input end of the first electromagnetic valve is in communication with the oil pump interface, the input end of the third electromagnetic valve and the output end of the gas tank at the same time; the output end of the first electromagnetic valve is respectively in communication with the heater interface and the input end of the fourth electromagnetic valve; the output end of the second electromagnetic valve is in communication with the gas pump interface, and the input end of the second electromagnetic valve is in communication with the gas tank input end interface; the input end of the third electromagnetic valve is in communication with the gas tank output end interface and the input end of the first electromagnetic valve at the same time, and the output end of the third electromagnetic valve is in communication with the oil barrel interface and the output end of the fourth electromagnetic valve at the same time.

5. The stage smoke machine with a fast spray gas column according to claim 1, characterized in that the smoke machine is further provided with a high-speed gas flow producing apparatus electrically connected to the controller, the high-speed gas flow producing apparatus is located on one side of the heater, and a gas nozzle of the high-speed gas flow producing apparatus is oriented in the same direction as a gas nozzle of the heater.

6. The stage smoke machine with a fast spray gas column according to claim 2, characterized in that the smoke machine is further provided with a high-speed gas flow producing apparatus electrically connected to the controller, the high-speed gas flow producing apparatus is located on one side of the heater, and a gas nozzle of the high-speed gas flow producing apparatus is oriented in the same direction as a gas nozzle of the heater.

7. The stage smoke machine with a fast spray gas column according to claim 3, characterized in that the smoke machine is further provided with a high-speed gas flow producing apparatus electrically connected to the controller, the high-speed gas flow producing apparatus is located on one side of the heater, and a gas nozzle of the high-speed gas flow producing apparatus is oriented in the same direction as a gas nozzle of the heater.

8. The stage smoke machine with a fast spray gas column according to claim 4, characterized in that the smoke machine is further provided with a high-speed gas flow producing apparatus electrically connected to the controller, the high-speed gas flow producing apparatus is located on one side of the heater, and a gas nozzle of the high-speed gas flow producing apparatus is oriented in the same direction as a gas nozzle of the heater.

9. An electromagnetic valve module, characterized by comprising a base and first and second electromagnetic valves mounted on the base, wherein the base is provided with an oil pump interface, a heater interface, a gas pump interface, a gas tank input end interface and a gas tank output end interface, and the input end of the first electromagnetic valve is in communication with the oil pump interface and the gas tank output end interface through conduits at the same time; the output end of the first electromagnetic valve is in communication with the heater interface through a conduit; and the output end of the second electromagnetic valve is in communication with the oil pump interface through a conduit, and the input end of the second electromagnetic valve is in communication with the gas tank input end interface through a conduit; and all the conduits are located in the base and are integrally formed with the base.

10. The electromagnetic valve module according to claim 9, characterized in that the oil pump interface and the gas tank output end interface are combined into an oil and gas interface.

11. The electromagnetic valve module according to claim 9, characterized in that the base further comprises a third electromagnetic valve and an oil barrel interface which are mounted on the base, and the input end of the first electromagnetic valve is in communication with the oil pump interface, the input end of the third electromagnetic valve and the gas tank output end interface through conduits at the same time; the output end of the third electromagnetic valve is in communication with the oil barrel interface through a conduit; and all the conduits are located in the base and are integrally formed with the base.

12. The electromagnetic valve module according to claim 11, characterized in that the base further comprises a fourth electromagnetic valve mounted on the base, and the output end of the first electromagnetic valve is in communication with the heater interface and the input end of the fourth electromagnetic valve at the same time; the output end of the fourth electromagnetic valve is in communication with the oil barrel interface through a conduit; and all the conduits are located in the base and are integrally formed with the base.

13. The electromagnetic valve module according to claim 9, characterized in that valve seats of the electromagnetic valves are formed integrally with the base, and main valve portions of the electromagnetic valves are threadedly connected to, or fastened to, or snap-fitted with, the valve seats in a sealed manner.

14. The electromagnetic valve module according to claim 10, characterized in that valve seats of the electromagnetic valves are formed integrally with the base, and main valve portions of the electromagnetic valves are threadedly connected to, or fastened to, or snap-fitted with, the valve seats in a sealed manner.

15. The electromagnetic valve module according to claim 11, characterized in that valve seats of the electromagnetic valves are formed integrally with the base, and main valve portions of the electromagnetic valves are threadedly connected to, or fastened to, or snap-fitted with, the valve seats in a sealed manner.

16. The electromagnetic valve module according to claim 12, characterized in that valve seats of the electromagnetic valves are formed integrally with the base, and main valve portions of the electromagnetic valves are threadedly connected to, or fastened to, or snap-fitted with, the valve seats in a sealed manner.

* * * * *